(12) United States Patent
Kanou et al.

(10) Patent No.: US 7,440,670 B2
(45) Date of Patent: Oct. 21, 2008

(54) RETENTION RELEASE AUXILIARY DEVICE FOR OPTICAL CONNECTOR AND PRINTED CIRCUIT BOARD DEVICE

(75) Inventors: Kouji Kanou, Fukuoka (JP); Hiroyuki Shouyama, Fukuoka (JP); Masahiko Kondo, Fukuoka (JP); Yoshiyuki Nakayama, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/976,893

(22) Filed: Oct. 29, 2007

(65) Prior Publication Data

US 2008/0112673 A1 May 15, 2008

(30) Foreign Application Priority Data

Nov. 15, 2006 (JP) .............................. 2006-309339

(51) Int. Cl.
*G02B 6/00* (2006.01)
*G02B 6/36* (2006.01)
*G02B 6/38* (2006.01)

(52) U.S. Cl. .......................... 385/139; 385/53; 385/75; 385/76; 385/134

(58) Field of Classification Search ........................ None
See application file for complete search history.

(56) References Cited

U.S. PATENT DOCUMENTS

| | | | | |
|---|---|---|---|---|
| 4,798,430 A | * | 1/1989 | Johnson et al. | 385/78 |
| 5,734,558 A | * | 3/1998 | Poplawski et al. | 361/752 |
| 6,017,153 A | | 1/2000 | Carlisle et al. | |
| 6,511,230 B1 | * | 1/2003 | Connelly et al. | 385/58 |
| 6,672,898 B2 | * | 1/2004 | Kahle et al. | 439/540.1 |
| 7,290,941 B2 | * | 11/2007 | Kiani et al. | 385/78 |
| 7,373,031 B2 | * | 5/2008 | Wang et al. | 385/14 |
| 7,377,699 B2 | * | 5/2008 | Terakura | 385/69 |
| 2002/0076164 A1 | * | 6/2002 | Childers et al. | 385/76 |
| 2003/0190123 A1 | * | 10/2003 | Kahle et al. | 385/59 |
| 2008/0044136 A1 | * | 2/2008 | Kanou et al. | 385/39 |
| 2008/0112671 A1 | * | 5/2008 | Kanou et al. | 385/56 |
| 2008/0112673 A1 | * | 5/2008 | Kanou et al. | 385/78 |

FOREIGN PATENT DOCUMENTS

| | | |
|---|---|---|
| JP | 63-184271 | 7/1988 |
| JP | 63-184272 | 7/1988 |
| JP | 63-184273 | 7/1988 |
| JP | 63184273 A * | 7/1988 |
| JP | 11-64682 | 3/1999 |
| JP | 3390697 | 1/2003 |
| JP | 2005-17602 | 1/2005 |
| JP | 2006-11102 | 1/2006 |

* cited by examiner

*Primary Examiner*—M. R. Connelly-Cushwa
(74) *Attorney, Agent, or Firm*—Staas & Halsey LLP

(57) ABSTRACT

A release auxiliary device (6) includes a base part (51) that is provided fixedly with respect to a receptacle (11), and an auxiliary lever (52) that is provided elastically deformable with respect to the base part (51) and elastically deformable in an orthogonal direction with respect to a direction in which a lever (41) is deformed. The auxiliary lever (52) includes an inclined pressing part (62) that is touchable, from a side, to an end portion of the lever (41), the inclined pressing part (62) presses against the end portion of the lever (41) and moves the lever (41) by pressing an outer surface side of the auxiliary lever (52) and deforming the auxiliary lever (52), enabling release of the engagement between engaging portions (42, 28).

5 Claims, 14 Drawing Sheets

RETENTION RELEASE AUXILIARY DEVICE FOR OPTICAL CONNECTOR AND PRINTED CIRCUIT BOARD DEVICE

BACKGROUND OF THE INVENTION

1. Field of the Invention

The present invention relates to a retention release auxiliary device for an optical connector including a plug to which an optical fiber is coupled and a receptacle into which the plug is inserted.

2. Description of the Related Art

Along with expansion of information networks in recent years, optical fiber communication has become mainstream. Further, it is required to increase the number of optical lines and the density thereof.

A communication device is installed in each node of an optical communication system. A printed circuit board having a function of housing an optical line and controlling the same is mounted on a rack shelf of the communication device. An interface optical connector is mounted on the printed circuit board and an optical fiber is detachably connected to the optical connector. Such optical connectors having various shapes are proposed or standardized (see Japanese unexamined patent publication Nos. 2005-17602 and 11-64682 and Japanese patent No. 3390697). For example, an LC type connector that can be decreased in size and increased in density is normally used in a communication carrier in North America.

Such an optical connector has a latch mechanism for retention. A plug to which an optical fiber is connected is inserted into a receptacle and thereby the latch mechanism operates automatically, ensuring the coupling between the plug and the receptacle. When a lever provided in the plug is operated by fingers to release the latch mechanism, the plug can be detached from the receptacle.

Upon the detachment of the plug, in the case of an environment where a sufficient space is secured, it is easy to operate a small lever with fingers and release the latch mechanism. However, it is not easy in the case where an optical connector is mounted in a small space.

Specifically, usually, a plurality of the printed circuit boards described above are densely mounted on a shelf. In the case where, for example, a plurality of the printed circuit boards are made adjacent to one another and are installed in a slot, a receptacle of an optical connector is attached to a step-like front plate that is fastened to each of the printed circuit boards. In this case, it is necessary to house also an extension area of an optical fiber connected to the optical connector in an area within the shelf. Accordingly, it necessarily follows that the mounting position of the optical connector is a position back from the shelf surface. Under this condition, it is difficult to put fingers in order to attach/detach the plug. In particular, it is hard to operate the lever with fingers to release the latch mechanism.

For this reason, upon the detachment of the plug, a tool is conventionally necessary to release the latch mechanism.

SUMMARY

The present disclosure is directed to solve the problems pointed out above, and therefore, an object of an embodiment of the present invention is to improve operability for retention release of an optical connector used for connection of an optical fiber. Another object of an embodiment of the present invention is to facilitate attachment/detachment of a plug even in the case where an optical connector is provided in a small space.

A device according to one aspect of the present invention is a retention release auxiliary device for an optical connector, the optical connector including a plug to which an optical fiber is coupled and a receptacle into which the plug is inserted. The plug is provided with a lever on a front side of a body of the plug, the lever being elastically deformable to approach the body of the plug by operating an end portion of the lever with fingers. An engaging portion formed in the lever engages with an engaging portion provided in the receptacle, leading to retention of the engaging portion of the lever and the engaging portion of the receptacle. The lever is caused to be deformed against an elastic force thereof by operating the end portion of the lever with fingers, so that the engagement between the engaging portions is released, enabling detachment of the plug from the receptacle. The retention release auxiliary device includes a base part that is provided fixedly with respect to the receptacle, and an auxiliary lever that is provided elastically deformable with respect to the base part and elastically deformable in an orthogonal direction with respect to a direction in which the lever is deformed. The auxiliary lever includes an inclined pressing part that is touchable, from a lateral side, to the end portion of the lever, the inclined pressing part presses against the end portion of the lever and moves the lever by pressing an outer surface side of the auxiliary lever and deforming the auxiliary lever, enabling release of the engagement between the engaging portions.

In the case where the plug is pulled out, a user preferably pushes an auxiliary lever with fingers. Thereby, the auxiliary lever is deformed elastically and the inclined pressing part moves and pushes the lever, so that the engagement with the receptacles is released. If the fingers are released from the auxiliary lever, then the auxiliary lever returns to the original position due to its elasticity.

Preferably, the base part may be formed to have a rectangular frame-like shape to surround outer circumference of the receptacle. The two auxiliary levers may be provided in side parts on both sides of the base part. Upon attachment of the receptacle to a front plate, the base part may be sandwiched between the receptacle and the front plate, so that the release auxiliary device is fastened.

The structure described above can improve operability for retention release of an optical connector used for connection of an optical fiber. In addition, the structure described above can facilitate attachment/detachment of a plug even in the case where an optical connector is provided in a small space.

These and other characteristics and objects of the present invention will become more apparent by the following descriptions of preferred embodiments with reference to drawings.

DESCRIPTION OF THE PREFERRED EMBODIMENTS

First Embodiment

Figure 1:
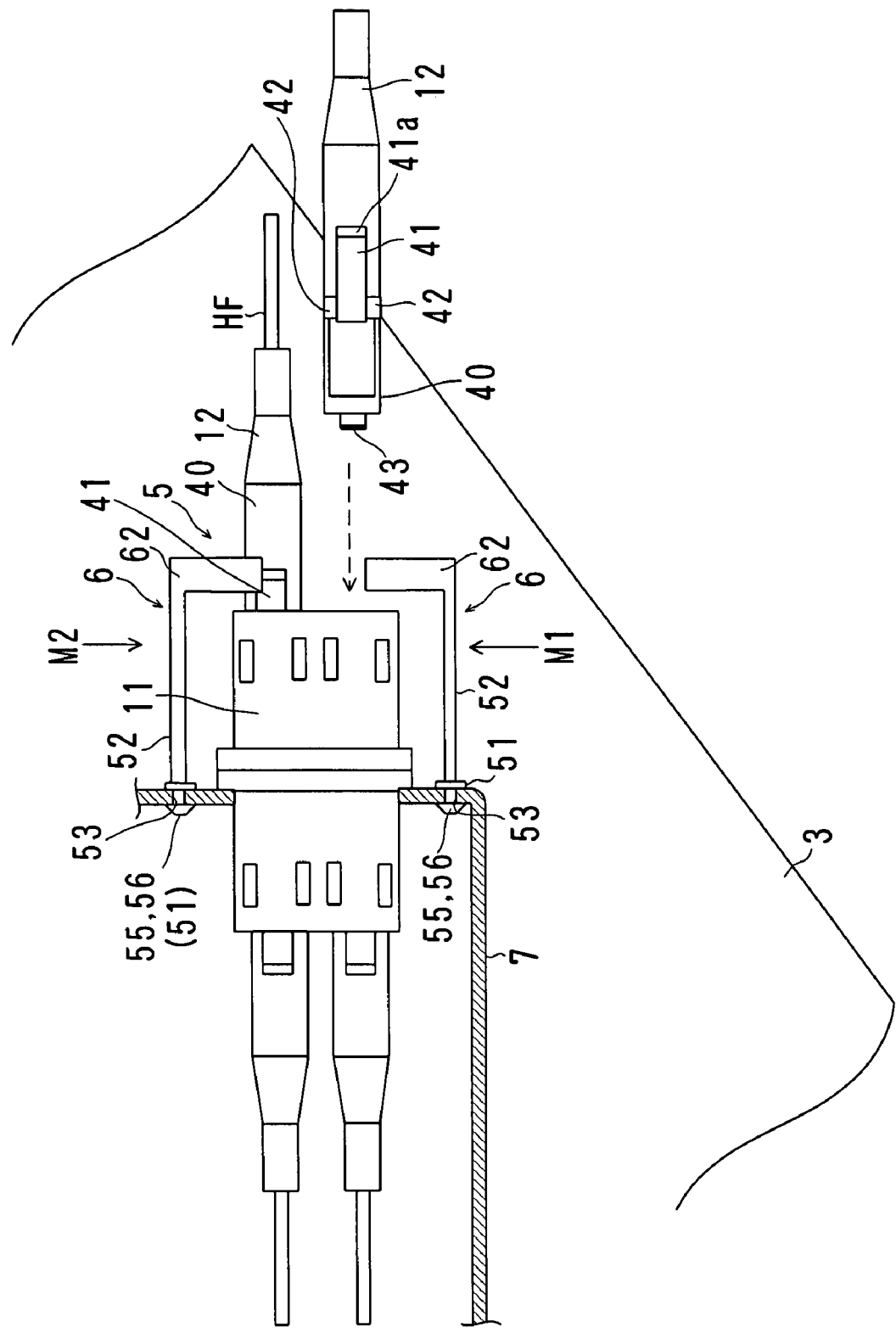
FIG. 1 is a plan view showing a printed circuit board according to a first embodiment of the present invention.
Figure 2:
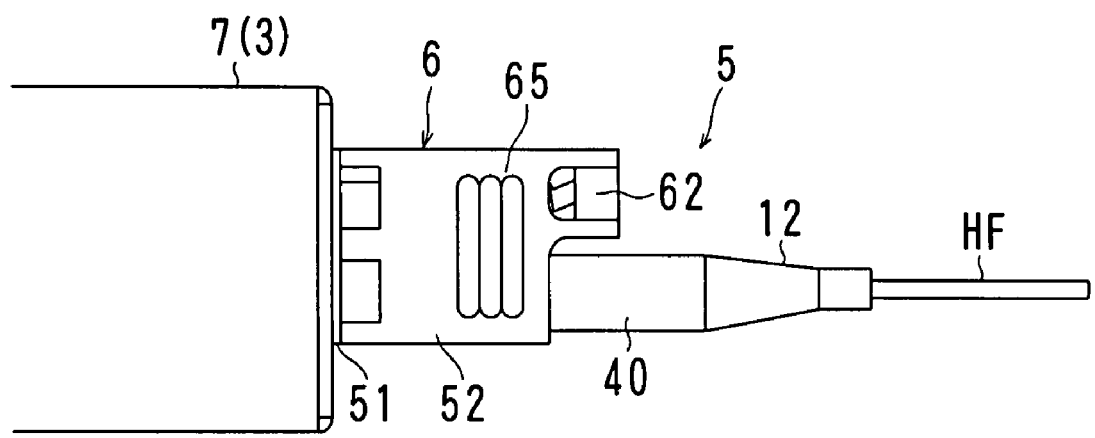
FIG. 2 is a front view of a printed circuit board.

Referring to FIGS. 1-4, a front plate (also referred to as a surface plate) 7 that is made of a thin metal plate or others and formed in a step-like shape is attached to the printed circuit board 3. The optical connector 5 and the release auxiliary device 6 are attached to the front plate 7. Note that the printed circuit board 3 is one of a plurality of the printed circuit boards mounted within a rack shelf of a communication device (not shown). The printed circuit boards are densely disposed in parallel to one another.

The optical connector 5 shown in this embodiment is a duplex optical connector in which two receptacles are formed to be integral with each other and a plug coupled to an optical fiber is inserted into each of the receptacles. Since the receptacles have the same structure and the plugs have the same structure, a description is given here of one of the receptacles and one of the plugs.

As described above, the optical connector 5 includes the plug 12 to which the optical fiber HF is coupled and the receptacle 11 into which the plug 12 is inserted. The optical connector 5 itself is a well-known LC type optical connector. Accordingly, since the shape, the structure, the operation method of each of the receptacle 11 and the plug 12 themselves are known, only a brief description is given here.

Figure 3:
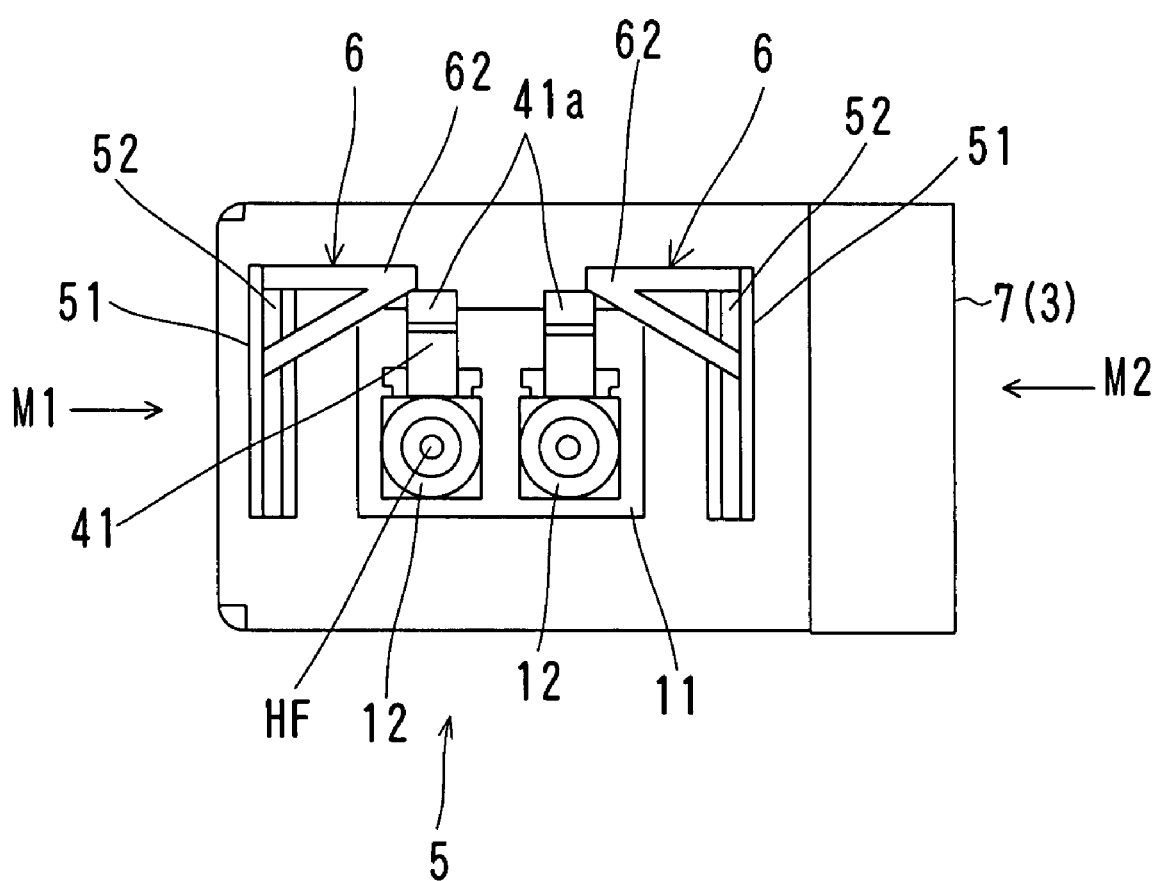
FIG. 3 is a right side view of a printed circuit board.
Figure 4:
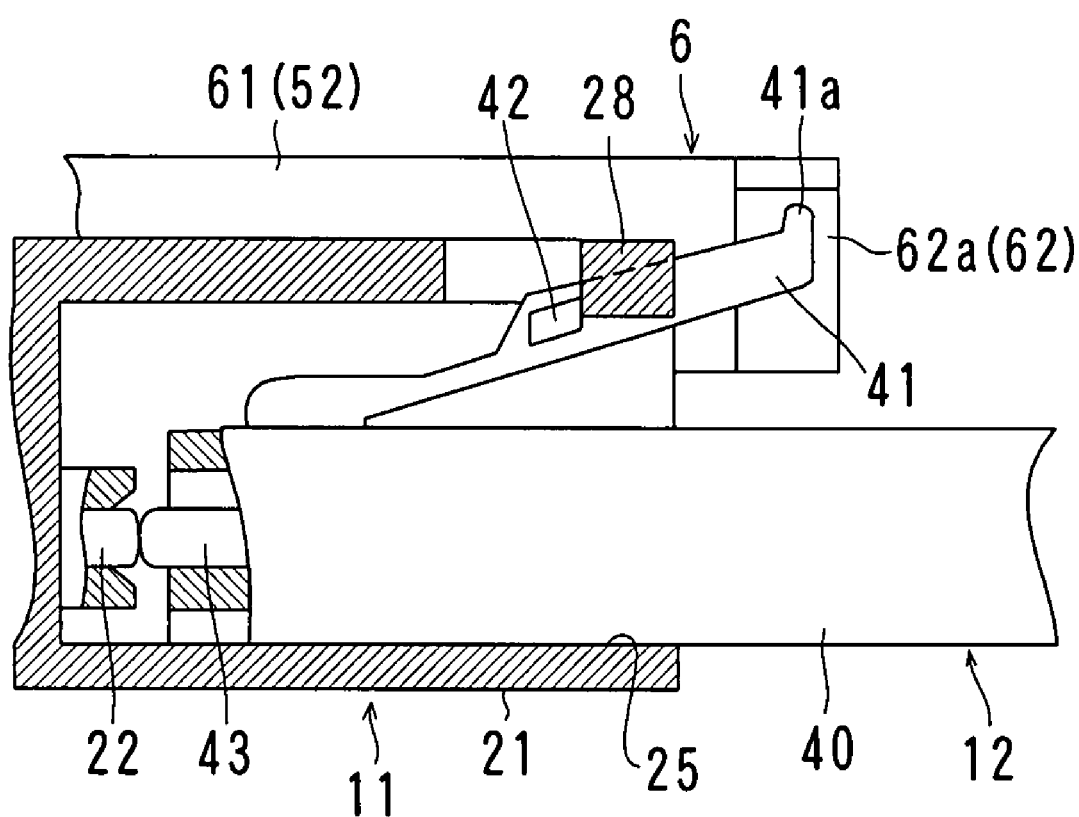
FIG. 4 is a front cross sectional view showing a part of an optical connector.

The plug 12 of the optical connector 5 is inserted from directly above the receptacle 11 shown in FIG. 3 and is connected to the receptacle 11. For this structure, the optical connector 5 is attached in a manner to project from the front plate 7. In order to detach the plug 12 from the receptacle 11, the plug 12 should be pulled while operating the release auxiliary device 6 with fingers.

Figure 6:
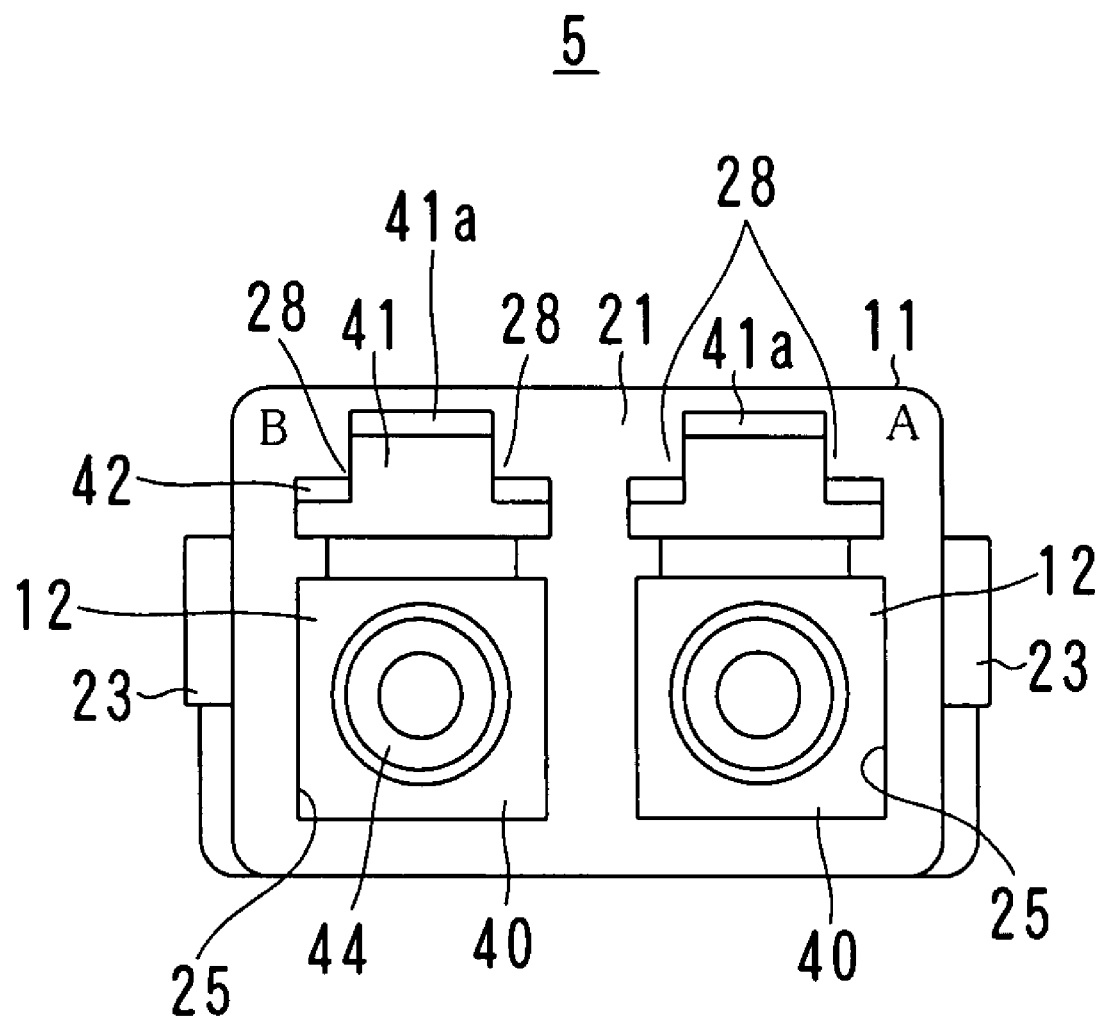
FIG. 6 is a right side view of an optical connector.
Figure 7:
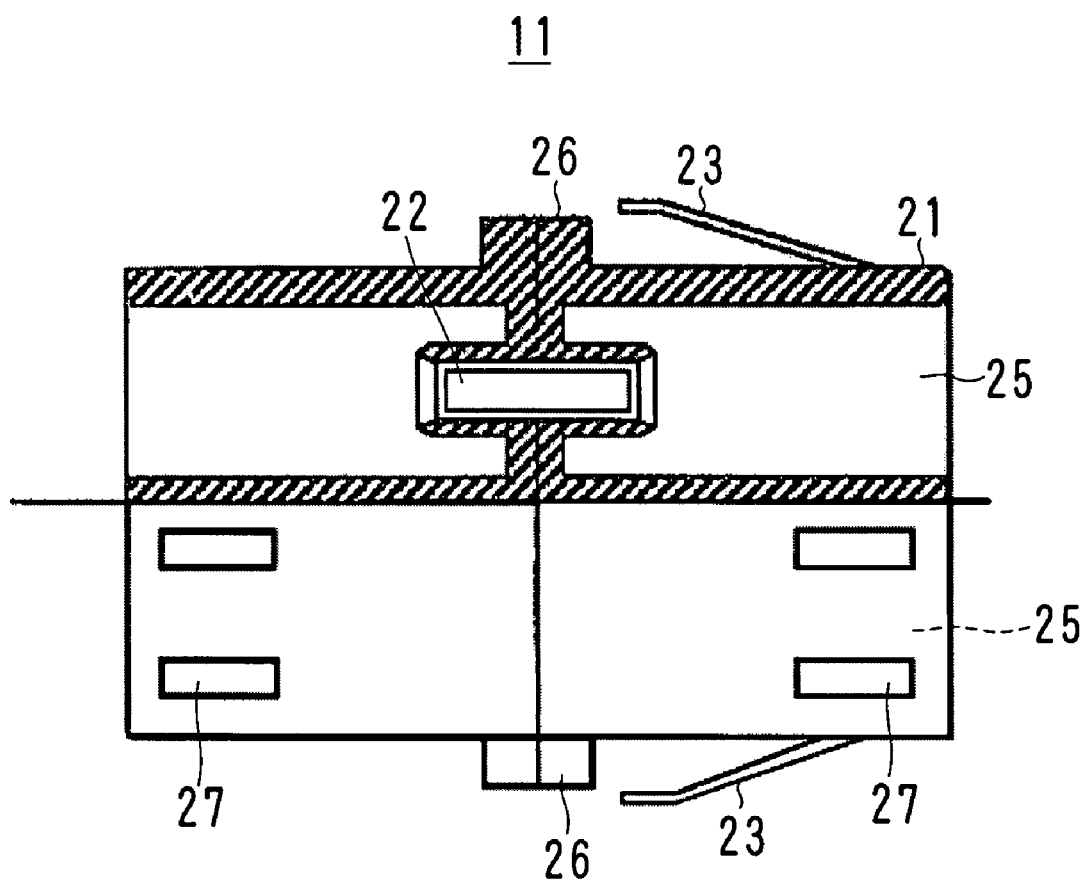
FIG. 7 is a top sectional view of an optical connector.

Referring also to FIGS. 6 and 7, the receptacle 11 includes a housing 21 that is made of synthetic resin and has a rectangular parallelepiped shape, a split sleeve 22 that is made of zirconia or the like and provided in the middle of the inside of the receptacle 11 and a fastener 23 that is made of a spring material. The housing 21 is provided with two holes 25. The plugs 12 are inserted from openings provided on both sides of the respective holes 25. An LC ferrule 43 that is provided in an end portion of each of the two plugs 12 inserted from the both sides into the same hole 25 touches to (abuts against) an end surface of the split sleeve 22 and is optically coupled to the optical fiber HF.

In order to attach the receptacle 11 to the front plate 7, a side of the receptacle 11 in which the fastener 23 is provided is inserted from the rear side of the front plate 7 into a rectangular hole provided on the front plate 7. An edge of the fastener 23 and a collar 26 provided in the housing 21 sandwich the front plate 7 at a position where the fastener 23 penetrates to the front side of the front plate 7. Thereby, the receptacle 11 is fixed to the front plate 7. A part of the wall surfaces of the housing 21 is provided with slit windows 27 leading to the holes 25.

The housing 21 has an inner surface that has a shape adapted to hold the plug 12 when the plug 12 is inserted. For example, the hole 25 of the housing 21 has a shape substantially the same as the cross-sectional shape of a body 40 of the plug 12. Further, projections 28 are formed which have a function of engaging with engaging convex portions 42 provided on both sides of a lever 41 of the plug 12 and of retaining the engaging convex portions 42 (see FIG. 4).

Figure 5A:
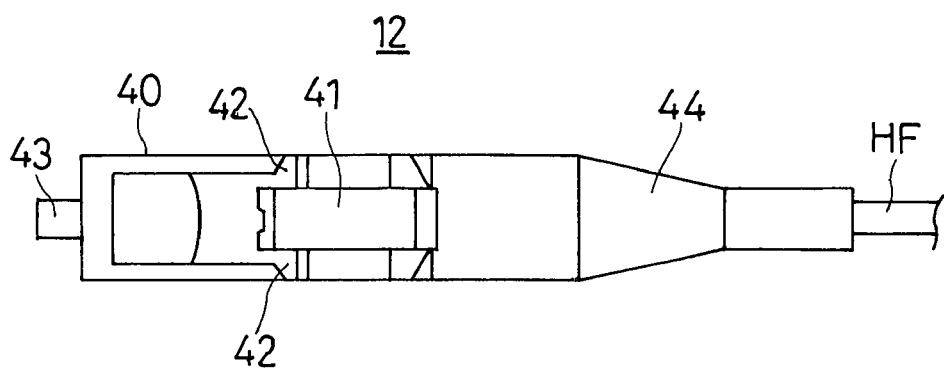
FIG. 5A and FIG. 5B are a top view and a front view of a plug constituting an optical connector.
Figure 5B:
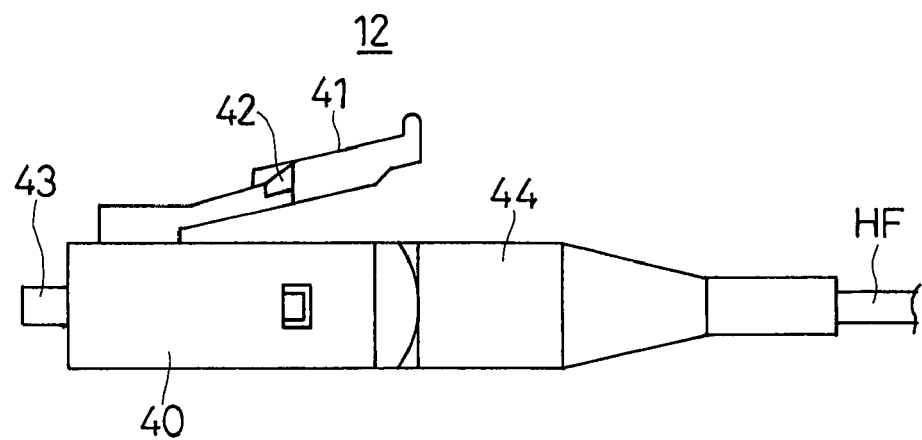

Referring to FIGS. 5A and 5B, the body 40 of the plug 12 is made of synthetic resin and is like a prism having a substantially square cross section. The lever 41 described above is formed to be integral with the body 40 on a side surface thereof on the front side. The lever 41 has elasticity and is capable of being deformed elastically to be close to the body 40 of the plug 12 by operating an end portion 41a of the lever 41 with fingers or the like. The engaging convex portions 42 are provided on both end surfaces in almost the center of the lever 41 to project from the lever 41 on both sides as shown in FIG. 5A. An end portion of the body 40 is provided with the LC ferrule 43 that is made of zirconia or the like and has a cylinder-like shape. The LC ferrule 43 is optically coupled, inside the body 40, to the optical fiber HF inserted from the rear end of the body 40. The rear end portion of the body 40 is covered with a tube 44 that serves to protect an extending part of the optical fiber HF.

Referring to FIGS. 1 and 4 again, in order to insert the plug 12 into the receptacle 11, the plug 12 is inserted into the hole 25 of the receptacle 11 as it is. Thereby, the lever 41 is pushed by the wall surface of the receptacle 11 and is deformed elastically, and the engaging convex portions 42 engage with the projections 28, so that the plug 12 is retained. In order to detach the plug 12 from the receptacle 11, the lever 41 is caused to be deformed against the elastic force thereof by holding the end portion 41a of the lever 41 with fingers or the like. Thereby, the engagement between the engaging convex portions 42 and the projections 28 is released, and under this state the plug 12 is detached from the receptacle 11. However, since it is not easy to operate the lever 41 directly with fingers, the lever 41 is operated through the release auxiliary device 6.

Next, referring to FIGS. 1-4, 8 and 9, a base part 51 and an auxiliary lever 52 of the release auxiliary device 6 are formed to be integral with each other using synthetic resin having elasticity such as ABS resin. The base part 51 is provided fixedly with respect to the receptacle 11. The auxiliary lever 52 is provided so that it is elastically deformable with respect to the base part 51 and elastically deformable in the orthogonal direction with respect to the direction in which the lever 41 is deformed.

Specifically, the auxiliary lever 52 includes a flat plate part 61 and an inclined pressing part 62. As described above, the flat plate part 61 is elastically deformable with respect to the base part 51. The inclined pressing part 62 is formed in an end of the flat plate part 61 to project from the surface thereof. The inclined pressing part 62 is touchable, from a lateral side, to the end portion 41a of the lever 41. The outer surface side of the auxiliary lever 52 is pushed by fingers and thereby the auxiliary lever 52 is deformed. Then, the inclined pressing part 62 presses against the end portion 41a of the lever 41 to move the lever 41. As a result, the engagement between the engaging convex portions 42 and the projections 28 is released. Note that the inclined pressing part 62 is not in contact with the lever 41 in the free state, and the inclined pressing part 62 comes into contact with the lever 41 when the auxiliary lever 52 is pushed by fingers.

As described earlier, since the receptacle 11 according to this embodiment is duplex, the two plugs 12 can be inserted into the receptacles 11 side by side. As clearly shown in FIGS. 1 and 3, the two release auxiliary devices 6 are provided, so that the levers 41 of the two plugs 12 can be operated separately. The auxiliary levers 52 of the respective release auxiliary devices 6 are so provided that the auxiliary levers 52 can be pushed in the directions shown by the arrows M1 and M2 by the operation from the outside of the bodies 40 of the two plugs 12.

The following is a further detailed description of the release auxiliary device 6.

Referring to FIGS. 8A-8C and 9, the base part 51 is formed to have a ribbon-like shape and two projections 55 and 56 project from the lower surface of the base part 51. The cross sectional shape of each of the projections 55 and 56 is an arrow-like shape. The projections 55 and 56 are inserted into slit-like holes 53 formed on the front plate 7 and thereby the entire release auxiliary device 6 is supported by the front plate 7.

The flat plate part 61 is provided with two rectangular holes 63 and 63 in a part where the flat plate part 61 is coupled to the base part 51. In other words, the flat plate part 61 is coupled to the base part 51 through three legs 63a. The operation of the release auxiliary device 6 deflects the legs 63a and the entire release auxiliary device 6 is deformed. The flat plate part 61 has, on its surface, three ribbon-like concave portions 64, which serve as an operating part 65. Stated differently, concavities and convexities are provided by the presence of the concave portions 64, which realizes slip resistance. Accordingly, when a user operates the release auxiliary device 6, he/she preferably puts fingers on the operating part 65 and presses the same.

Figure 8A:
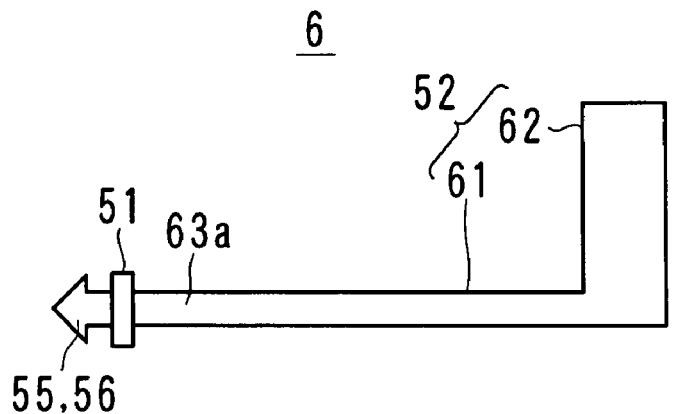
FIG. 8A, 8B and 8C show a shape of a release auxiliary device according to the first embodiment.
Figure 8B:
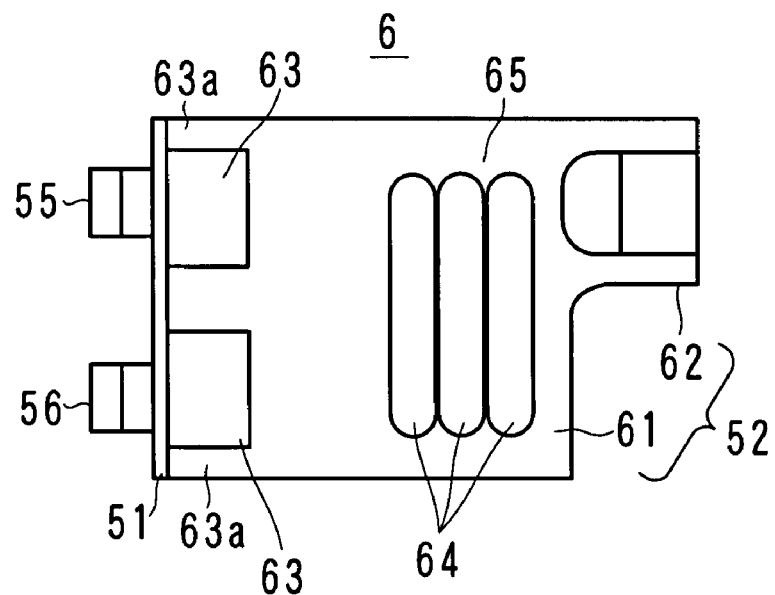
Figure 8C:
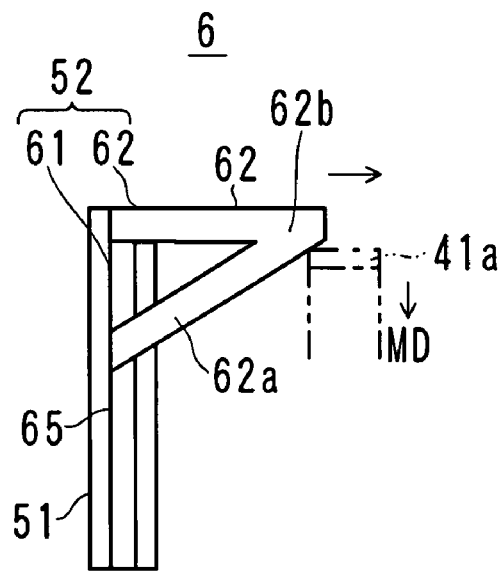
Figure 9:
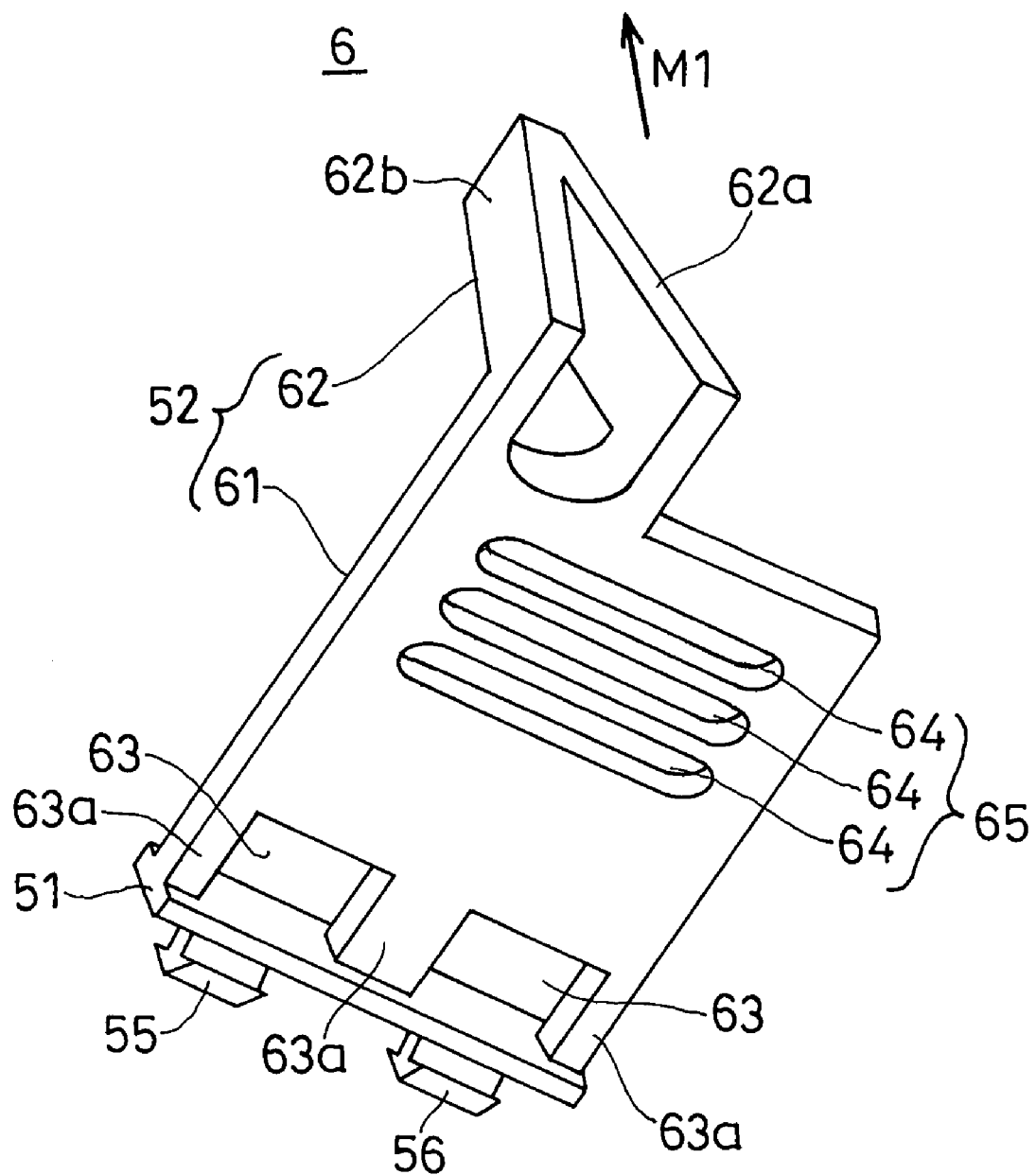
FIG. 9 is a perspective view of a release auxiliary device.

As clearly shown in FIGS. 8C and 9, the inclined pressing part 62 includes a slope portion 62a extending to an end of the flat plate part 61 and a support portion 62b and is formed to have a V-shape. The slope portion 62a has approximately 30 degrees with respect to the direction shown by the arrow M1 that is the direction in which the release auxiliary device 6 is deformed. The movement of the slope portion 62a in the direction shown by the arrow M1 causes the end portion 41a of the lever 41 to move in the direction shown by the arrow MD, so that the lever 41 is pushed in while it is deformed. As a result, the engagement between the engaging convex portions 42 and the projections 28 is released as described above.

In order to detach the plug 12, a user preferably pushes, with fingers, the auxiliary levers 52 from the outside of the body 40 of the plug 12. Thereby, the auxiliary lever 52 is deformed elastically, the inclined pressing part 62 moves, and the lever 41 is pushed, so that the engagement with the receptacle 11 is released. If the fingers are released from the auxiliary lever 52, the auxiliary lever 52 returns to the original position due to its elasticity. Thus, even in the case where the optical connector 5 is attached in a small space, a space necessary for operation for releasing the engagement of the lever 41 can be easily secured. Further, interference due to the touch of fingers on the plug 12 does not occur and a user can easily release the engagement of the lever 41 with easy operation.

In the case where the receptacle 11 is simplex, only a single release auxiliary device 6 may be provided. Further, even in the case where the receptacle 11 is duplex or more, the release auxiliary devices 6 may be provided only in the necessary positions.

Second Embodiment

The following is a description of a release auxiliary device 6B according to the second embodiment.

The first embodiment provides a structure in which one release auxiliary device 6 is applied to one plug 12. Accordingly, the example is described in which two release auxiliary devices 6 are used for a duplex receptacle 11. In contrast, in the second embodiment, an example is described in which two auxiliary levers 52 are provided in one release auxiliary device 6B, that is, an example of a duplex release auxiliary device 6B is described.

The functions of individual elements of the release auxiliary device 6B in the second embodiment are the same as those of the release auxiliary device 6 in the first embodiment. Accordingly, the same symbols are given to elements of the release auxiliary device 6B that have the same functions as those of the release auxiliary device 6. The following description basically focuses on the differences between the release auxiliary device 6B and the release auxiliary device 6.

Figure 10:
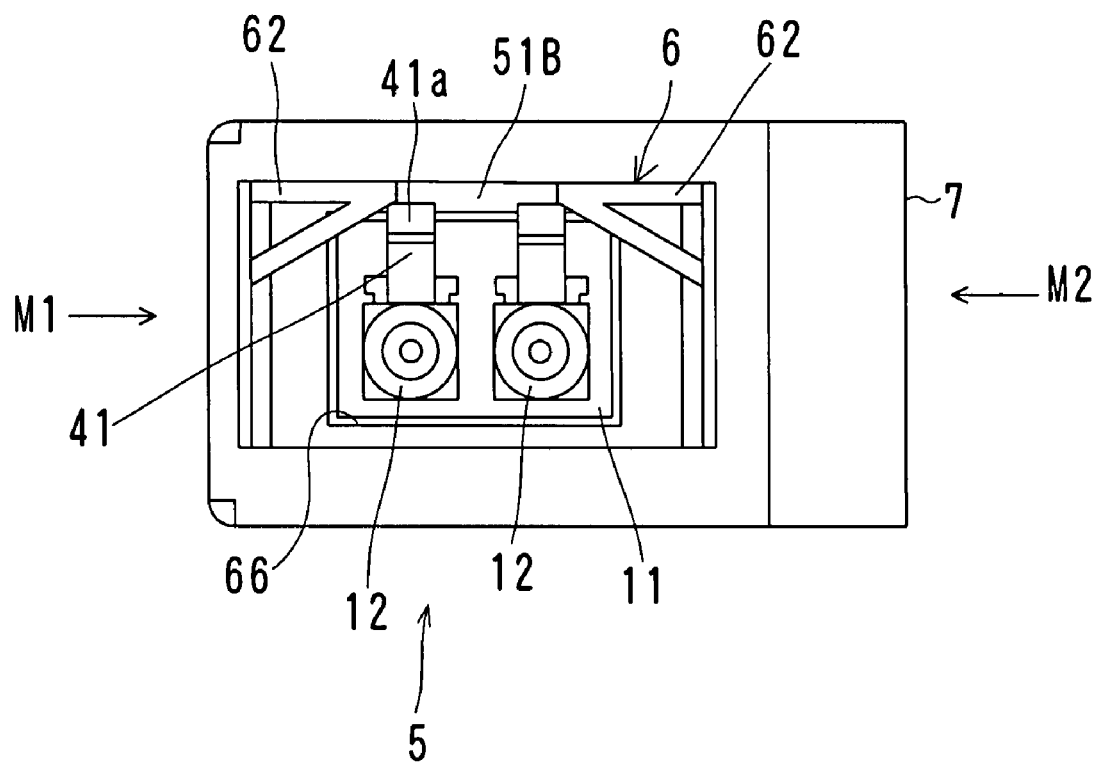
FIG. 10 is a right side view of a printed circuit board according to a second embodiment.
Figure 11A:
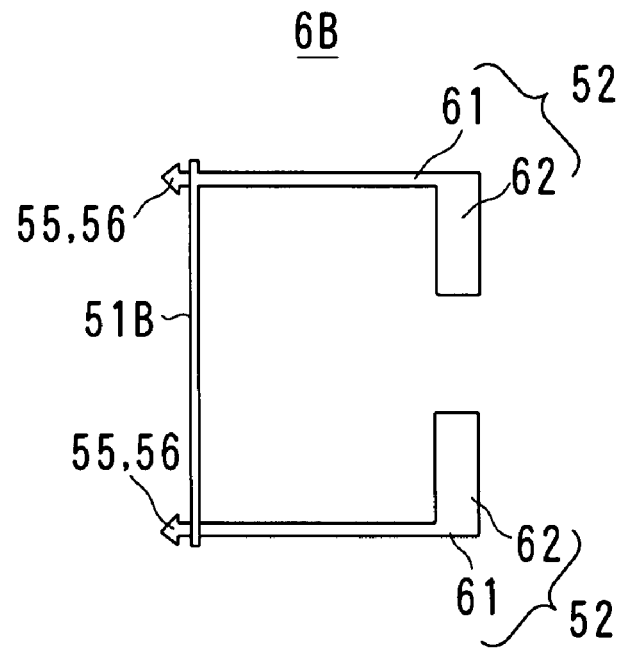
FIG. 11A, 11B and 11C show a shape of a release auxiliary device according to the second embodiment.
Figure 11B:
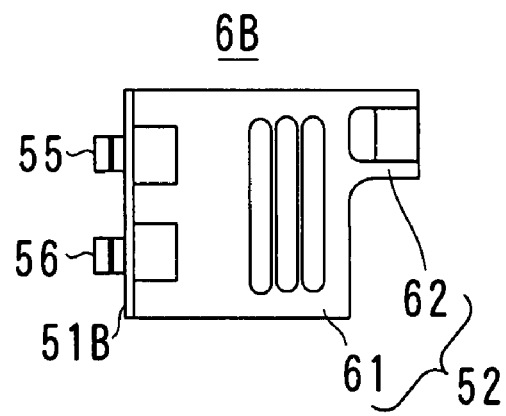
Figure 11C:
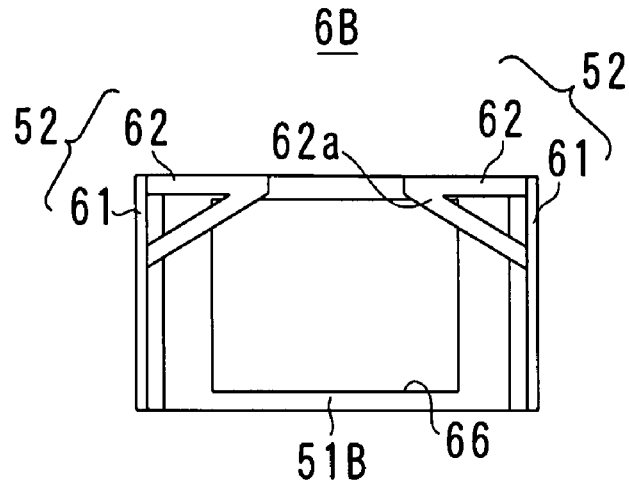
Figure 12:
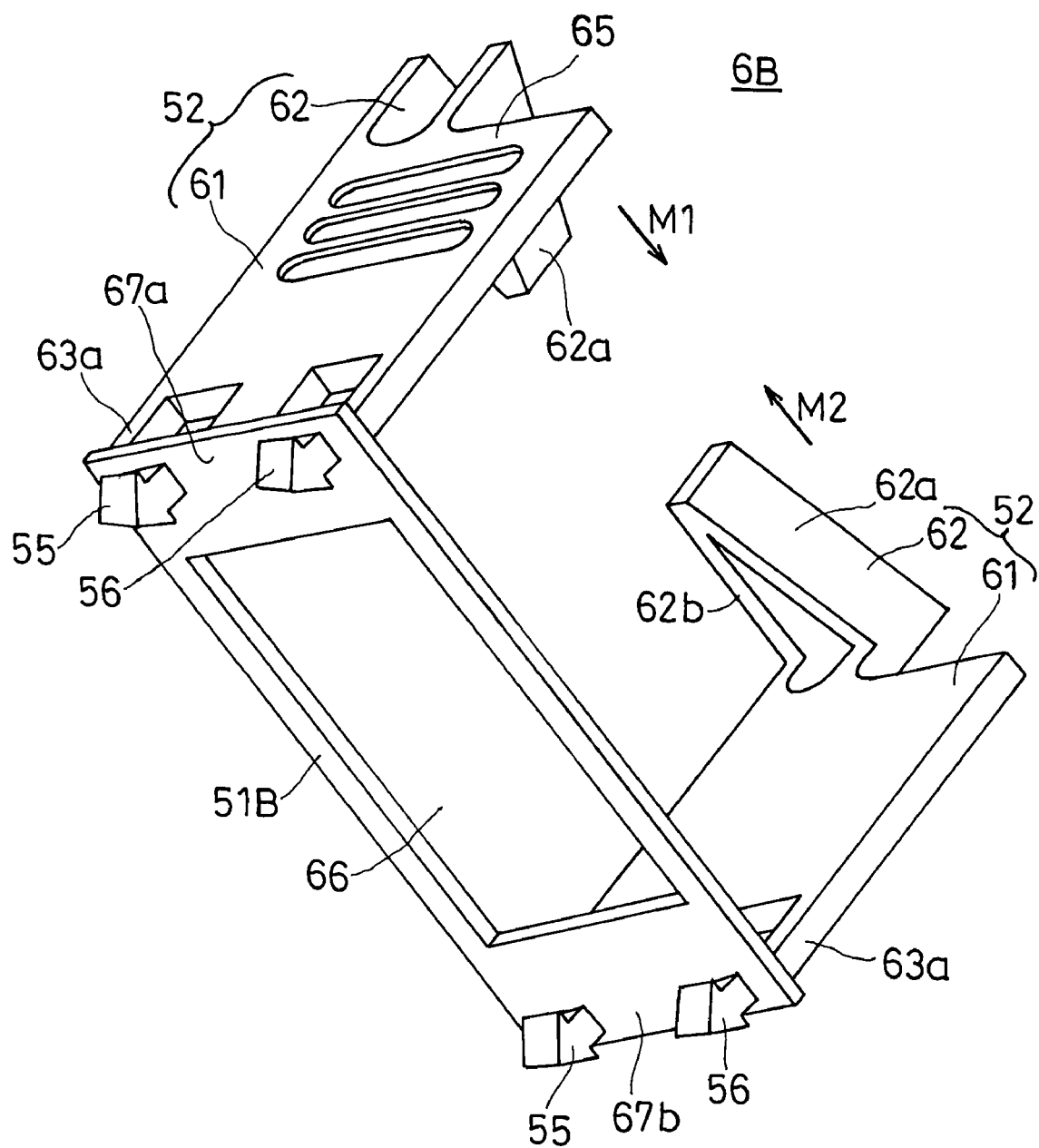
FIG. 12 is a perspective view of a release auxiliary device.

FIG. 10 is a right side view of the printed circuit board 3 using the release auxiliary device 6B according to the second embodiment, FIG. 11A is a plan view showing the release auxiliary device 6B according to the second embodiment, FIG. 11B is a front view of the same and FIG. 11C is a right side view of the same, and FIG. 12 is a perspective view of the release auxiliary device 6B.

Referring to FIGS. 10-12, the release auxiliary device 6B is so structured that the entire base part 51B and the entire two auxiliary levers 52 are formed to be integral with one another using synthetic resin having elasticity.

The base part 51B is formed to have a rectangular frame-like shape to surround the outer circumference of the receptacle 11. More specifically, the base part 51B has a shape in which a rectangular hole 66 is formed on a rectangular plate-like material. The hole 66 has a size that allows the receptacle 11 to sufficiently pass therethrough to avoid interference with the entire receptacle 11.

The base part 51B has side parts 67a and 67b on the both sides thereof. Each of the side parts 67a and 67b has, on their rear surfaces, two projections 55 and 56. The four projections 55 and 56 are inserted into the four holes 53 formed on the front plate 7 respectively, so that the release auxiliary device 6B is fastened to the front plate 7. The front surfaces of the side parts 67a and 67b are provided with the two auxiliary levers 52 that are formed to be integral with the side parts 67a and 67b respectively. The two auxiliary levers 52 can release engagement of each of the levers 41 of the two plugs 12.

As described above, in the release auxiliary device 6B according to the second embodiment, one release auxiliary device 6B is attached to the duplex receptacle 11, and thereby the retention of the two plugs 12 can be released separately. Thus, the case of the second embodiment can provide a simple structure and easy attachment, compared to the case of the first embodiment.

Third Embodiment

The following is a description of a release auxiliary device 6C according to the third embodiment.

In the first and second embodiments, the release auxiliary devices 6 and 6B are produced by molding using synthetic resin. In contrast, in the third embodiment, a duplex release auxiliary device 6C is produced by sheet metal working.

In the release auxiliary device 6C according to the third embodiment, the overall shape and functions of individual elements are the same as those of the release auxiliary device 6B according to the second embodiment. The main difference from the release auxiliary device 6B is that the release auxiliary device 6C is produced by sheet metal working using a metal material having elasticity. However, a shape change associated with the sheet metal working is performed. In the first and second embodiments, the release auxiliary devices 6 and 6B are fastened to the front plate 7 by using the projections 55 and 56 provided on the rear surfaces of the base parts 51 and 51B. In the third embodiment, without providing the projections 55 and 56, a base part 51C is sandwiched between the front plate 7 and the receptacle 11, so that the release auxiliary device 6C is fastened.

Figure 13:
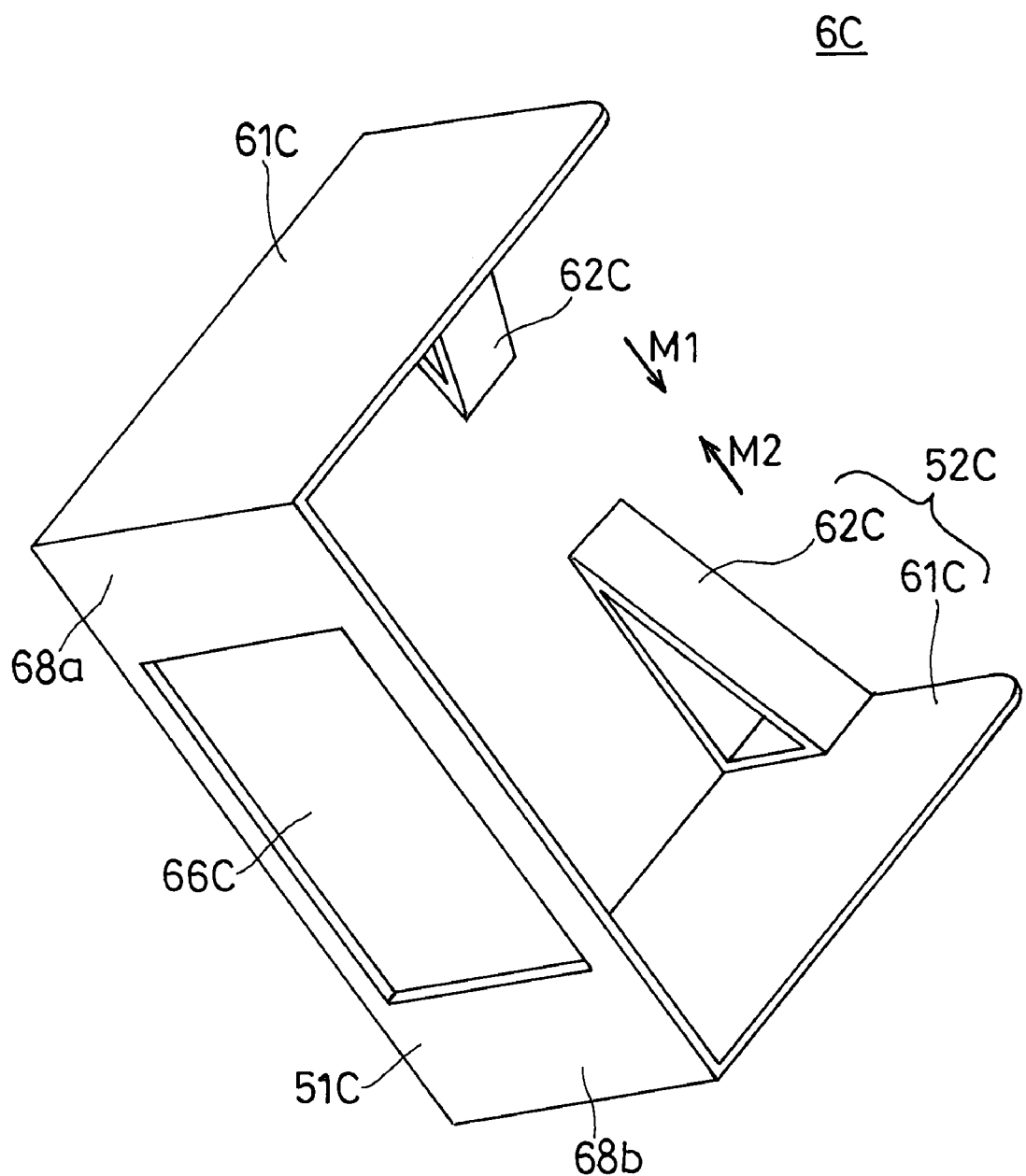
FIG. 13 is a perspective view of a release auxiliary device according to a third embodiment.
Figure 14:
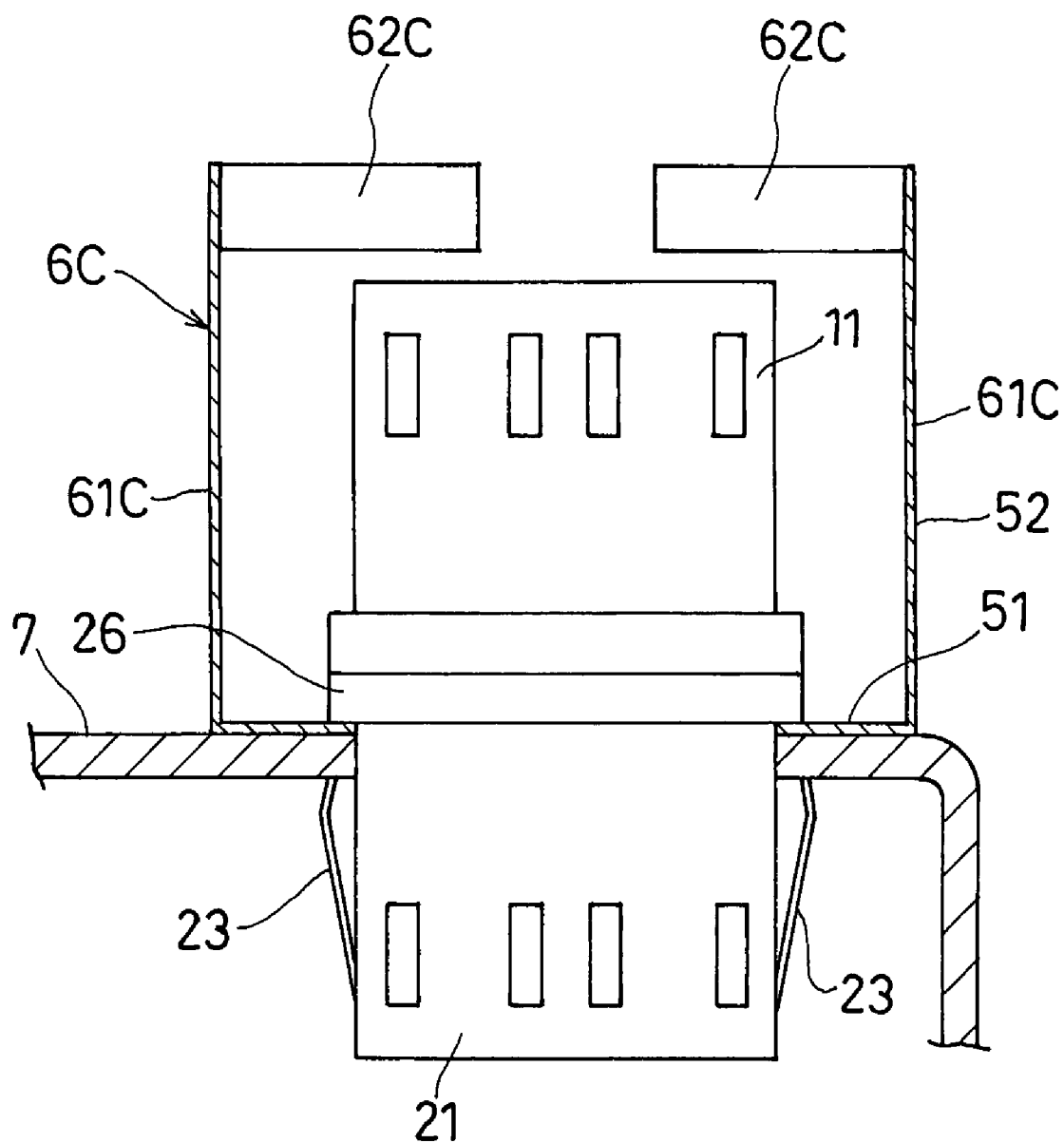
FIG. 14 is a plan cross sectional view showing a state in which a release auxiliary device is attached to a front plate.

FIG. 13 is a perspective view of the release auxiliary device 6C according to the third embodiment, and FIG. 14 is a plan cross sectional view showing a state in which the release auxiliary device 6C is attached to the front plate 7.

Referring to FIGS. 13 and 14, the base part 51C and two auxiliary levers 52C of the release auxiliary device 6C are formed by sheet metal working of a thin metal sheet having elasticity. The metal sheet can be, for example, a steel sheet or stainless steel sheet having a thickness of approximately a few tenths of a millimeter. A metal sheet is bent so that the base part 51C and two flat plate parts 61C provided on the both sides of the base part 51C are formed to be integral with one another. Each of two inclined pressing parts 62C is formed by welding a metal part obtained by bending a metal sheet into a triangular shape at a predetermined position of each of the flat plate parts 61C.

The base part 51C has a hole 66C formed to have a rectangular frame-like shape to surround the outer circumference of the receptacle 11. The size of the hole 66 is the same as the size of the contour of the housing 21 of the receptacle 11. Accordingly, the housing 21 of the receptacle 11 can pass through the hole 66C, while the collar 26 cannot pass through the same because the contour of the collar 26 is large. In other words, the size of the hole 66C is the same as the size of a hole formed on the front plate 7 that is provided for attachment of the receptacle 11. The two auxiliary levers 52C are provided in side parts 68a and 68b of the base part 51 by bending work.

The release auxiliary device 6C is placed on the front surface of the front plate 7 so that the hole 66C of the release auxiliary device 6C corresponds to the hole of the front plate 7. Under this state, the housing 21 of the receptacle 11 is inserted into the hole 66C from the side of the release auxiliary device 6C. As shown in FIG. 14, the collar 26 is strongly pressed against the front surface of the base part 51C, and thereby an edge of each of the fasteners 23 of the receptacle 11 engages with the rear surface of the front plate 7. Thus, the release auxiliary device 6C is sandwiched between the front plate 7 and the receptacle 11, so that it is fastened. Instead, since the base part 51C has a small thickness, even when the base part 51C overlaps with the front plate 7, the fasteners 23 deflect appropriately, enabling the attachment.

The release auxiliary device 6C according to the third embodiment eliminates the need for the projections 55 and 56 described in the second embodiment and the holes 53 of the front plate 7 for attachment, resulting in the simple structure. Accordingly, the release auxiliary device 6C can be easily attached to existing printed circuit boards having no holes 53 for attachment.

The inclined pressing part 62C may be formed to have, for example, a V-shape instead of a triangular shape. The inclined pressing part 62C can be fastened to the flat plate part 61C by methods other than welding, for example, by the use of adhesive. The inclined pressing part 62C can be formed to be integral with the flat plate part 61C from the beginning, instead of attaching the inclined pressing part 62C to the flat plate part 61C later. For example, the base part 51C, the auxiliary levers 52C and the inclined pressing parts 62C are formed to have an extendible shape and can be provided by bending or spreading out the extensible shape part.

It is possible to produce the inclined pressing parts 62C from synthetic resin or the like and attach the inclined pressing parts 62C to the flat plate parts 61C, instead of producing the inclined pressing parts 62C from a metal sheet. Note that, upon the production of the release auxiliary device 6C, a metal sheet may be subjected to appropriate surface treatment.

In the embodiments described above, the flat plate parts 61, 61B and 61C have, on their end portions, are provided with the inclined pressing parts 62, 62B and 62C. Instead, however, the flat plate parts 61, 61B and 61C may project upward beyond the inclined pressing parts 62, 62B and 62C.

In the release auxiliary devices 6, 6B and 6C described above, the overall structure of the base part, the auxiliary lever, the flat plate part, the inclined pressing part and the release auxiliary device 6, the structures of various portions thereof, the shape, the size, the number, and the materials thereof, and the like may be changed as needed, in accordance with the subject matter of the present invention. Further, the release auxiliary device 6 can be applied to optical connectors having various shapes and structures as the optical connector 5.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A retention release auxiliary device for an optical connector, the optical connector including a plug to which an optical fiber is coupled and a receptacle into which the plug is inserted, wherein the plug is provided with a lever on a front side of a body of the plug, the lever being elastically deformable to approach the body of the plug by operating an end portion of the lever with fingers, an engaging portion formed in the lever engages with an engaging portion provided in the receptacle, leading to retention of the engaging portion of the lever and the engaging portion of the receptacle, the lever is caused to be deformed against an elastic force thereof by operating the end portion of the lever with fingers, so that the engagement between the engaging portions is released, enabling detachment of the plug from the receptacle, the retention release auxiliary device comprises a base part that is provided fixedly with respect to the receptacle, and an auxiliary lever that is provided elastically deformable with respect to the base part and elastically deformable in an orthogonal direction with respect to a direction in which the lever is deformed, and the auxiliary lever includes an inclined pressing part that is touchable, from a lateral side, to the end portion of the lever, the inclined pressing part presses against the end portion of the lever and moves the lever by pressing an outer surface side of the auxiliary lever and deforming the auxiliary lever, enabling release of the engagement between the engaging portions.

2. The device according to claim 1, wherein the auxiliary lever has a shape in which an end of a flat plate part that is elastically deformable is provided with the inclined pressing part.

3. The device according to claim 1,
wherein the receptacle is configured to receive at least two plugs side by side therein, and
the base part is provided with two of the auxiliary levers to enable separate operation of the levers of the two plugs, and the two auxiliary levers are so provided that they are operated and pressed from outside of the bodies of the two plugs.

4. The device according to claim 3,
wherein the base part is formed to have a rectangular frame-like shape to surround outer circumference of the receptacle, the two auxiliary levers are provided in side parts on both sides of the base part, and
upon attachment of the receptacle to a front plate, the base part is sandwiched between the receptacle and the front plate, so that the release auxiliary device is fastened.

5. A printed circuit board device comprising:
an optical connector that is mounted on a front side of a printed circuit board; and
the retention release auxiliary device for an optical connector according to claim 1 that is attached to the optical connector.

* * * * *